United States Patent
Mathison

(10) Patent No.: US 10,495,257 B2
(45) Date of Patent: Dec. 3, 2019

(54) HEAT LOAD REDUCTION ON HYDROGEN FILLING STATION

(71) Applicant: Honda Motor Co., Ltd., Tokyo (JP)

(72) Inventor: Steven R. Mathison, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 15/588,752

(22) Filed: May 8, 2017

(65) Prior Publication Data

US 2018/0320822 A1    Nov. 8, 2018

(51) Int. Cl.
*F17C 5/06* (2006.01)
*F17C 7/00* (2006.01)

(52) U.S. Cl.
CPC .............. *F17C 5/06* (2013.01); *F17C 7/00* (2013.01); *F17C 2221/012* (2013.01); *F17C 2227/0339* (2013.01); *F17C 2250/043* (2013.01); *F17C 2250/0439* (2013.01); *F17C 2250/0631* (2013.01); *F17C 2270/0581* (2013.01)

(58) Field of Classification Search
CPC ...... F17C 2227/0306; F17C 2227/0339; F17C 2221/012; F17C 5/06; F17C 7/00; F17C 2250/043; F17C 2250/0439; F17C 2250/0631; F17C 2270/0581
See application file for complete search history.

(56) References Cited

U.S. PATENT DOCUMENTS

| | | | | |
|---|---|---|---|---|
| 1,057,081 A | * | 3/1913 | Neiman | F24H 3/006 165/104.27 |
| 2,499,901 A | * | 3/1950 | Brown, Jr. | F28D 7/06 165/160 |
| 3,815,672 A | * | 6/1974 | Bullard | B21D 53/085 165/150 |
| 4,625,378 A | * | 12/1986 | Tanno | B21D 53/085 29/727 |
| 4,749,384 A | | 6/1988 | Nowobilski et al. | |
| 6,363,728 B1 | | 4/2002 | Udischas et al. | |
| 6,899,146 B2 | | 5/2005 | Bingham et al. | |
| 7,377,294 B2 | | 5/2008 | Handa | |
| 7,575,012 B2 | * | 8/2009 | Miki | F17C 5/007 137/1 |
| 7,637,292 B2 | | 12/2009 | Handa | |
| 7,681,604 B2 | | 3/2010 | Handa | |
| 7,735,528 B2 | | 6/2010 | Handa | |
| 7,743,797 B2 | | 6/2010 | Handa | |
| 7,757,726 B2 | | 7/2010 | Handa | |
| 7,757,727 B2 | | 7/2010 | Handa | |
| 7,891,386 B2 | | 2/2011 | Handa | |

(Continued)

FOREIGN PATENT DOCUMENTS

JP    2009052674    3/2009
WO    2015169939    11/2015

*Primary Examiner* — Andrew D StClair
(74) *Attorney, Agent, or Firm* — Rankin, Hill & Clark LLP

(57) ABSTRACT

According to one or more aspects, a hydrogen fueling station is provided and includes one or more hydrogen fuel storage tanks, a pressure control device positioned downstream from the hydrogen fuel storage tanks, a dispenser positioned downstream from the pressure control device, and a heat load reduction line which forms a circulation loops from a first point downstream of the pressure control device to one or more of the hydrogen fuel storage tanks.

11 Claims, 4 Drawing Sheets

(56) References Cited

U.S. PATENT DOCUMENTS

| | | | |
|---|---|---|---|
| 7,938,149 B2 | 5/2011 | Handa | |
| 2008/0216914 A1* | 9/2008 | Handa | F17C 13/12 141/4 |
| 2010/0236259 A1* | 9/2010 | Brunner | F17C 1/00 62/48.1 |
| 2010/0307636 A1* | 12/2010 | Uemura | F17C 5/06 141/4 |
| 2014/0196814 A1* | 7/2014 | Nagura | F17C 5/007 141/82 |
| 2016/0091143 A1* | 3/2016 | Cohen | F17C 5/06 137/12 |
| 2018/0306383 A1* | 10/2018 | Poag | F17C 9/02 |

* cited by examiner

HEAT LOAD REDUCTION ON HYDROGEN FILLING STATION

BACKGROUND

Safety of hydrogen tank refueling is recognized as an important consideration in determining the success of hydrogen fueled vehicles in the marketplace. Under current safety guidelines, the refueling of compressed hydrogen tanks are to be conducted in a manner that prevents the tank from overheating (e.g., temperatures exceeding 85° C.) during refueling and/or from overfilling the tank to a point at which the pressure could exceed 125% of normal working pressure (NWP) at any time.

Additionally, failing to ensure that a target temperature is maintained can inconvenience customers and cause them to be unable to refill their tanks in a timely manner (e.g., as a result of delays or waiting for the temperature to come into specification), thereby reducing customer satisfaction, station revenue, and/or repeat business. Further, operating a station with a constant temperature regardless of current ambient conditions results in excessive energy usage and reduced well-to-wheel energy efficiency.

BRIEF DESCRIPTION

According to one aspect, a hydrogen fueling station is provided, and includes one or more hydrogen fuel storage tanks, a pressure control device, a dispenser, and a heat load reduction line. The pressure control device is positioned downstream from the hydrogen fuel storage tanks and connected to the hydrogen fuel storage tanks by one or more first fuel lines. The dispenser is positioned downstream from the pressure control device and is connected to the pressure control device by a second fuel line. The heat load reduction line forms one or more circulation loops from a first point downstream of the pressure control device to one or more of the hydrogen fuel storage tanks and back to a second point downstream of the pressure control device.

The hydrogen fueling station may include a compressor positioned upstream from the hydrogen fuel storage tanks and connected to the hydrogen fuel storage tanks. The hydrogen fueling station may include one or more temperature sensors monitoring one or more temperatures of hydrogen fuel stored in one or more of the hydrogen fuel storage tanks. The hydrogen fueling station may include a heat exchanger positioned downstream from the pressure control device and connected to the pressure control device. The hydrogen fueling station may include a controller controlling flow of the hydrogen fuel through one or more of the circulation loops of the heat load reduction line based on one or more of the temperatures of the hydrogen fuel within the hydrogen fuel storage tanks.

According to one aspect, a hydrogen fueling station is provided and includes a first hydrogen fuel storage tank, a pressure control device positioned downstream from the first hydrogen fuel storage tank and connected to the first hydrogen fuel storage tank, a dispenser positioned downstream from the pressure control device and connected to the pressure control device, and a heat load reduction line which includes a first circulation loop from a first point downstream of the pressure control device to the first hydrogen fuel storage tank and back to a second point downstream of the pressure control device.

The hydrogen fueling station may include a second hydrogen fuel storage tank. The pressure control device may be positioned downstream from the second hydrogen fuel storage tank and connected to the second hydrogen fuel storage tank. The heat load reduction line may include a second circulation loop from the first point downstream of the pressure control device to the second hydrogen fuel storage tank and back to the second point downstream of the pressure control device. The second hydrogen fuel storage tank may be cascaded with the first hydrogen fuel storage tank.

The hydrogen fueling station or the hydrogen fuel storage tanks may include a first temperature sensor and a second temperature sensor. The first temperature sensor may monitor a first temperature of the hydrogen fuel stored in the first hydrogen fuel storage tank. The second temperature sensor may monitor a second temperature of the hydrogen fuel stored in the second hydrogen fuel storage tank.

The hydrogen fueling station may include one or more valves and a controller. One or more of the valves may be configured to control flow of hydrogen fuel through the first circulation loop and the second circulation loop. The controller may control operation of one or more of the valves based on the first temperature and the second temperature.

The controller may operate the valves to bypass both the first and second circulation loops of the heat load reduction line based on a temperature of the first point downstream of the pressure control device being less than or equal to both the first temperature and the second temperature. The controller may operate the valves to flow hydrogen fuel through the first circulation loop of the heat load reduction line based on the first temperature being less than the second temperature. The controller may operate the valves to flow hydrogen fuel through the second circulation loop of the heat load reduction line based on the second temperature being less than the first temperature.

The heat load reduction line may include one or more protrusions. The protrusions may be fins. The path of the heat load reduction line may have a shape of a loop, an 'S', or a zig-zag.

The hydrogen fueling station may include a compressor positioned upstream from the first hydrogen fuel storage tank and connected to the first hydrogen fuel storage tank. The hydrogen fueling station may include a heat exchanger positioned downstream from the pressure control device and connected to the pressure control device.

According to an aspect, a hydrogen fueling station is provided and includes one or more hydrogen fuel storage tanks, a pressure control device positioned downstream from the hydrogen fuel storage tanks, a dispenser positioned downstream from the pressure control device, and a heat load reduction line which forms a circulation loop from a first point downstream of the pressure control device to one or more of the hydrogen fuel storage tanks, wherein hydrogen fuel within the heat load reduction line does not mix with the hydrogen fuel within the hydrogen fuel storage tanks. The hydrogen fueling station may include one or more temperature sensors monitoring one or more temperatures of hydrogen fuel stored in one or more of the hydrogen fuel storage tanks.

DETAILED DESCRIPTION

Figure 1:
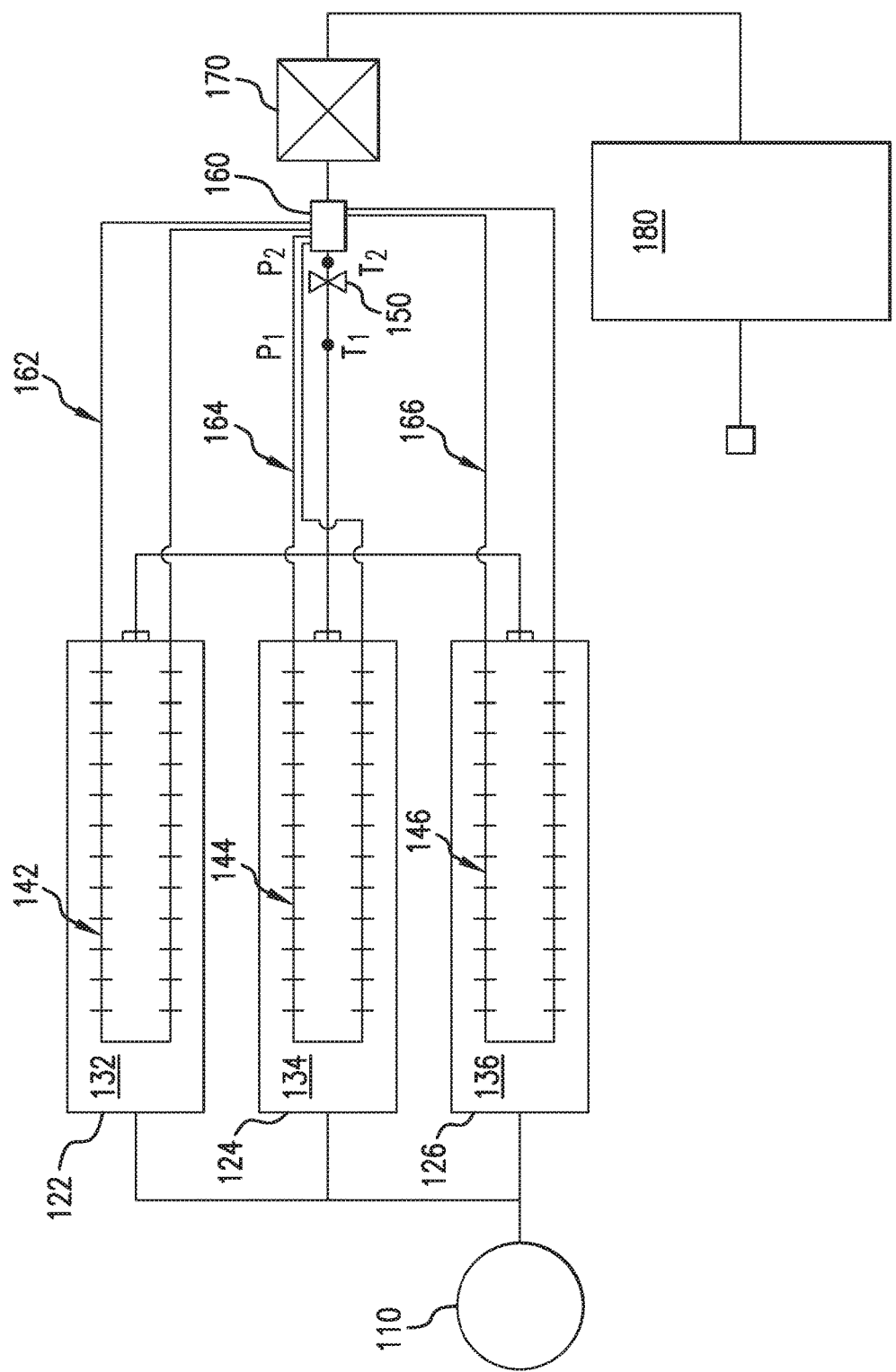
FIG. 1 is an exemplary hydrogen fueling station, according to one or more embodiments.

FIG. 1 is an exemplary hydrogen fueling station 100, according to one or more embodiments. The hydrogen fueling station 100 may include a compressor 110, one or more hydrogen fuel storage tanks 122, 124, 126, one or more fuel lines, a pressure control device 150, one or more temperature sensors 152, 154, 156 for corresponding hydrogen fuel storage tanks 122, 124, 126, heat load reduction lines 162, 164, 166, a controller 160, one or more valves, a heat exchanger 170, and a dispenser 180.

The compressor 110 is positioned upstream from the other components of the hydrogen fueling station 100, and compresses hydrogen fuel which is stored within one or more of the hydrogen fuel storage tanks 122, 124, 126. The compressor 110 may be any compressor which is capable of pressurizing hydrogen fuel, such as a reciprocating piston compressor, an ionic liquid piston compressor, an electrochemical hydrogen compressor, a hydride compressor, a piston-metal diaphragm compressor, a guided rotor compressor, or a linear compressor. In any event, the compressor 110 may be used to fill one or more of the hydrogen fuel storage tanks 122, 124, 126 and be connected to the hydrogen fuel storage tanks 122, 124, 126.

One or more of the hydrogen fuel storage tanks 122, 124, 126 may be positioned downstream from the compressor 110 and connected to the compressor 110. In one or more embodiments, the hydrogen fuel storage tanks 122, 124, 126 are arranged in a cascaded fashion so that when a first hydrogen fuel storage tank 122 of the hydrogen fuel storage tanks 122, 124, 126 is empty, close to empty, or below a threshold volume or threshold pressure, fueling switches to a second hydrogen fuel storage tank 124 of the hydrogen fuel storage tanks 122, 124, 126, thereby providing a cascading effect. For example, the first hydrogen fuel storage tank 122 may be opened initially, and shut down when pressure is low in the first hydrogen fuel storage tank 122. Then, the second hydrogen fuel storage tank 124 may be opened. In this way, a cascade fill may be provided.

The pressure control device 150 may be positioned downstream from the hydrogen fuel storage tanks 122, 124, 126 and connected to the hydrogen fuel storage tanks 122, 124, 126 by one or more fuel lines. The pressure control device 150 may control or regulate the pressure of the hydrogen fuel from a point upstream of the pressure control device 150 to a point downstream from the pressure control device 150. Stated another way, the pressure control device 150 controls the filling of a fuel tank of a hydrogen vehicle.

In FIG. 1, P1 represents the pressure of the point directly upstream from the pressure control device 150 and P2 represents the pressure of the point directly downstream from the pressure control device 150. Similarly, T1 represents the temperature of the point directly upstream from the pressure control device 150 and T2 represents the temperature of the point directly downstream from the pressure control device 150. Because the hydrogen fuel storage tanks 122, 124, 126 are pressurized by the compressor 110, P1>P2 generally. If P1>>P2, (e.g., P1 is significantly greater than P2 due to the pressure differential caused by the pressure control device 150) heating may occur at T2, thereby resulting in T2>T1. Further, as one or more of the hydrogen fuel storage tanks 122, 124, 126 empty, and the cascading of these tanks occurs, T1 may drop, causing a greater difference in T2>T1. This heating is generally known as throttling or the Joule Thompson Effect. Regardless, this scenario may be undesirable because refueling guidelines call for refueling to be conducted in a manner that prevents the tank from overheating.

In this regard, the heat load reduction lines 162, 164, 166 may be provided to reduce an amount of energy required to remove excess heat at T2 (e.g., because the heat exchanger 170 may require additional energy to be powered). Effectively, the heat load reduction lines 162, 164, 166 are lines which may include one or more circulation loops 132, 134, 136 from a first point downstream from the pressure control device 150 which routes the hydrogen fuel (e.g., associated with temperature T2) to one or more of the hydrogen fuel storage tanks 122, 124, 126, thereby utilizing the cooler temperature of the hydrogen fuel storage tanks 122, 124, 126 to cool the hydrogen fuel, which is then routed back to another point downstream from the pressure control device 150. The heat load reduction lines 162, 164, 166 and circulation loops 132, 134, 136 are configured such that hydrogen fuel within the heat load reduction lines 162, 164, 166 does not mix with hydrogen fuel from any of the hydrogen fuel storage tanks 122, 124, 126.

Stated another way, one or more circulation loops 132, 134, 136 are provided from a point downstream of the pressure control device 150 (e.g., based on the heat load reduction lines 162, 164, 166 being fed behind the pressure control device 150) to one or more of the hydrogen fuel storage tanks 122, 124, 126. In any event, the heat load reduction lines 162, 164, 166 may form or include one or more circulation loops 132, 134, 136 from a first point downstream of the pressure control device 150 to one or more of the hydrogen fuel storage tanks 122, 124, 126 and back to a second point downstream of the pressure control device 150. When one or more circulation loops 132, 134, 136 are in use, hydrogen fuel flows from the first point downstream of the pressure control device 150 to one or more of the hydrogen fuel storage tanks 122, 124, 126 and back down to the second point downstream of the pressure control device 150. The hydrogen fuel, according to this aspect, would not flow directly from the first point to the second point, but would flow from the first point, through the associated circulation loop, to the second point.

In one or more embodiments, the heat load reduction lines 162, 164, 166 may include one or more protrusions on a path within one or more of the hydrogen fuel storage tanks 122, 124, 126. These protrusions may be fins 142, 144, 146, according to one or more aspects. Additionally, hydrogen fuel may flow through one or more of the fins 142, 144, 146 in one or more embodiments. Alternatively, hydrogen fuel may merely flow by or around the fins 142, 144, 146 in other embodiments. The protrusions may increase the surface area that the hydrogen fuel (e.g., which is from the T2 point downstream from the pressure control device 150) is exposed to while being run through a path internal to one or more of the hydrogen fuel storage tanks 122, 124, 126 associated with temperatures <T2, thereby cooling the hydrogen fuel. In this way, the heat load reduction lines 162, 164, 166 may utilize hydrogen fuel upstream from the pressure control device 150 as a heat sync or a heat exchanger which is upstream from the pressure control device 150. Further, the path of the heat load reduction lines 162, 164, 166 or the path of one or more of the circulation loops 132, 134, 136 may be in the shape of a loop, an 'S', a zig-zag, or other shapes, etc.

In one or more embodiments, the controller 160 controls one or more valves to selectively activate one or more of the circulation loops 132, 134, 136 of the heat load reduction lines 162, 164, 166 based on one or more detected temperatures of the hydrogen fuel storage tanks 122, 124, 126 from temperature sensors 152, 154, 156. In other words, the controller 160 may control flow of the hydrogen fuel through one or more of the circulation loops 132, 134, 136 of the heat load reduction lines 162, 164, 166 based on one or more temperatures of hydrogen fuel within the hydrogen fuel storage tanks 122, 124, 126. For example, if there are two hydrogen fuel storage tanks 122 and 124 (e.g., a first hydrogen fuel storage tank 122 and a second hydrogen fuel storage tank 124), the controller 160 may control operation of one or more of the valves based on a first temperature associated with the first hydrogen fuel storage tank 122 and a second temperature associated with the second hydrogen fuel storage tank 124. An example of the control would include the controller 160 receiving the first and second temperatures, and routing the hydrogen fuel through a path associated with the tank having the cooler temperature. Control of the valves will be described in greater detail in FIG. 2.

For example, in one or more embodiments, the controller 160 routes the hydrogen fuel from T2 to the coldest hydrogen fuel storage tank. One or more of the hydrogen fuel storage tanks 122, 124, 126 may be outfitted with one or more temperature sensors 152, 154, 156 monitoring one or more temperatures of hydrogen fuel stored in the corresponding tanks 122, 124, 126. For example, a first temperature sensor 152 may monitor the temperature of the first hydrogen fuel storage tank 122 and a second temperature sensor 154 may monitor the temperature of the second hydrogen fuel storage tank 124. The controller 160 may receive both the temperatures and determine which tank is colder by comparing the temperatures of both tanks 122 and 124.

Continuing with the example with the first hydrogen fuel storage tank 122 and the second hydrogen fuel storage tank 124, if each tank has a circulation loop (e.g., a first circulation loop 132 associated with the first hydrogen fuel storage tank 122 and a second circulation loop 134 associated with the second hydrogen fuel storage tank 124), the controller 160 may operate the valves to flow hydrogen fuel through the first circulation loop 132 of the heat load reduction line 162 based on the first temperature associated with the first hydrogen fuel storage tank 122 being less than the second temperature associated with the second hydrogen fuel storage tank 124. Conversely, if the second temperature is less than the first temperature, the controller 160 may operate the valves to flow hydrogen fuel through the second circulation loop 134 of the heat load reduction lines 164. This example is described with respect to FIG. 2 below.

As another example, the controller 160 may bypass the heat load reduction lines 162, 164, 166 when the temperature of the hydrogen fuel storage tanks 122, 124, 126 is greater than the temperature at T2. In other words, the controller 160 may order the valves to bypass one or more circulation loops 132, 134, 136 (e.g., the first circulation loop 132 and the second circulation loop 134) of the heat load reduction lines 162, 164, 166 based on the temperature at T2 being less than or equal to the first temperature associated with the first hydrogen fuel storage tank 122 and the second temperature associated with the second hydrogen fuel storage tank 124. As such, the heat exchanger 170 may be utilized in these scenarios.

In one or more embodiments, the heat exchanger 170 is implemented to remove excess heat at T2 (e.g., when T2 gets hot as a result of a heating effect from the pressure differential caused by the pressure control device 150). The heat exchanger 170 may be positioned downstream from the pressure control device 150 and connected to the pressure control device 150. However, it will be appreciated that in other embodiments, the heat exchanger 170 may be removed entirely from the hydrogen filling station based on the heat load reduction lines 162, 164, 166 and/or circulation loops 132, 134, 136 thereof. The dispenser 180 may be positioned downstream from the pressure control device 150 and connected to the pressure control device 150.

Figure 2:
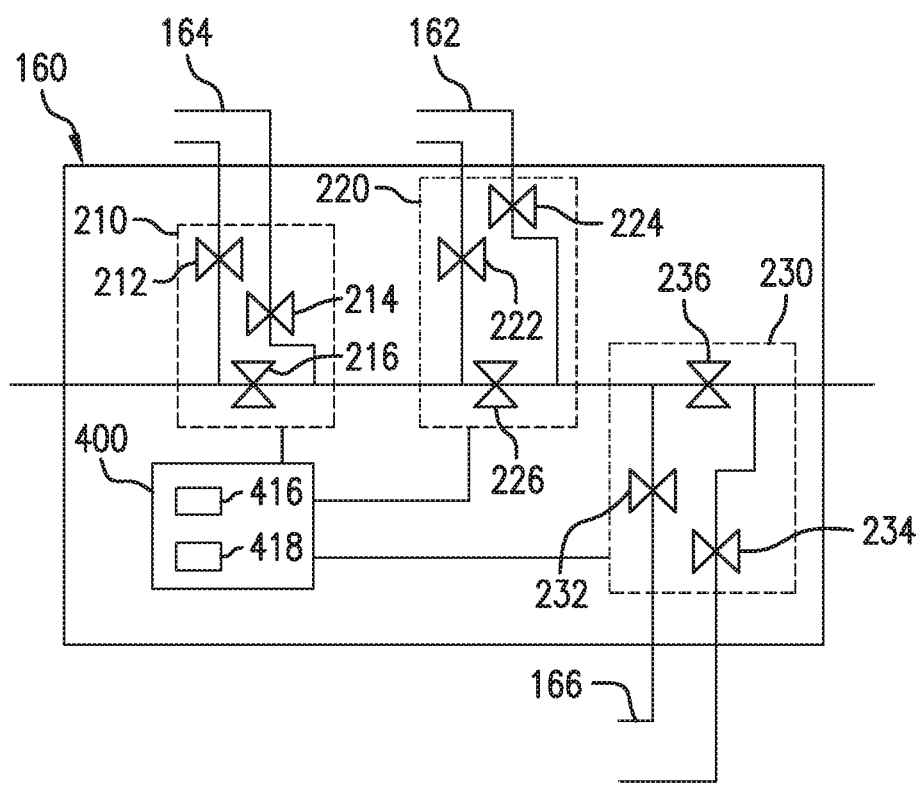
FIG. 2 is an exemplary controller controlling associated valves for a hydrogen fueling station, according to one or more embodiments.

FIG. 2 depicts an exemplary controller 160 and associated valves for a hydrogen fueling station 100, according to one or more embodiments. However, other embodiments are contemplated where different arrangements of valves enable hydrogen fuel to flow from a first point downstream of the pressure control device 150 to one or more of the hydrogen fuel storage tanks 122, 124, 126 and back to a second point downstream of the pressure control device 150.

Figure 4:
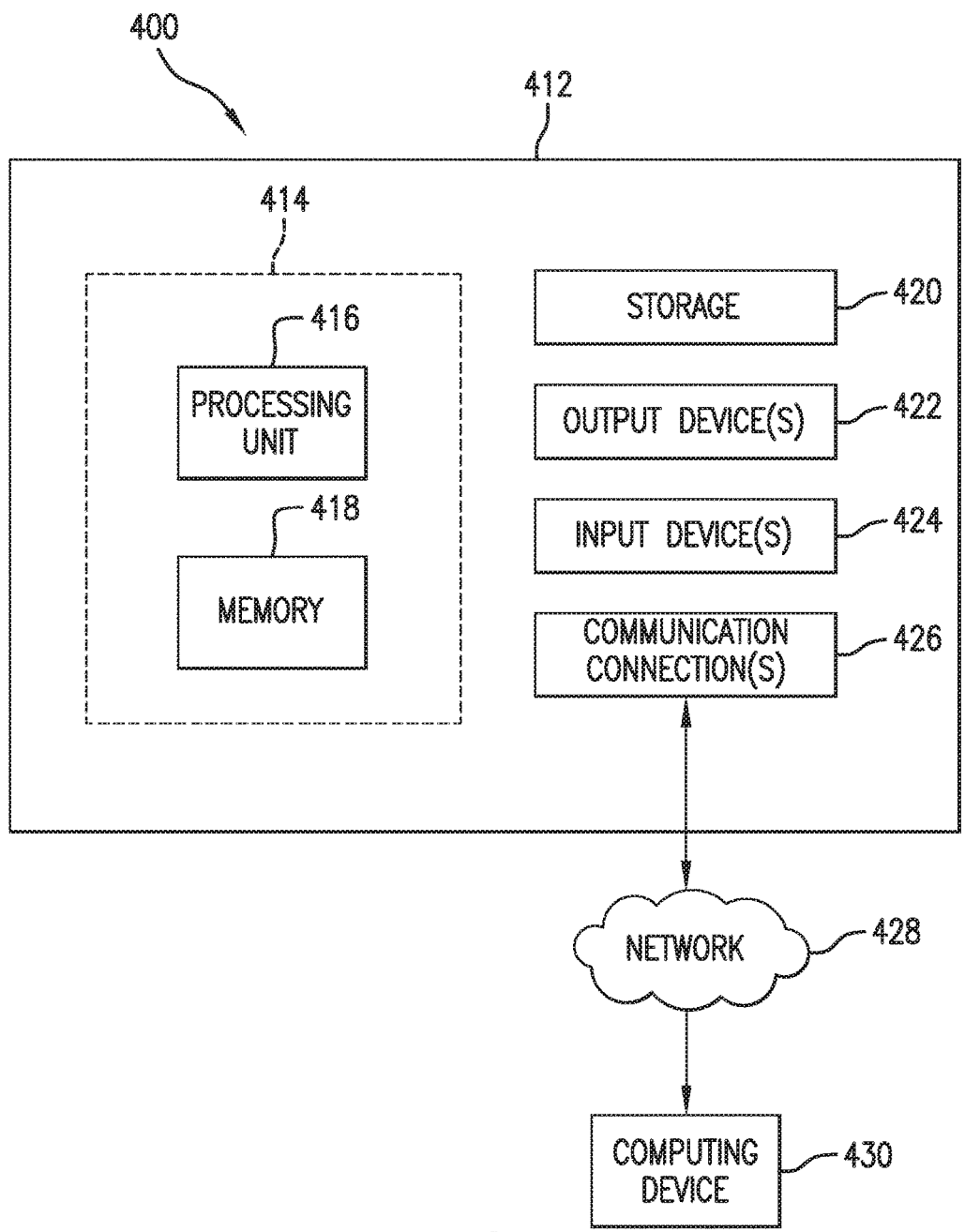
FIG. 4 is an illustration of an example computing environment where one or more of the provisions set forth herein are implemented, according to one or more embodiments.

As seen in FIG. 2, the controller 160 includes a system 400 or a computing device and a processing unit 416 and a memory 418, which are described in greater detail in FIG. 4. In any event, the processing unit 416 and memory 418 may be configured to manage one or more groups of valves 210, 220, 230, which are depicted in FIG. 2 in dashed lines. As such, FIG. 2 is an exemplary controller 160 which operates three groups of valves 210, 220, 230 corresponding to the three hydrogen fuel storage tanks 122, 124, 126 of FIG. 1, which are connected via the corresponding heat load reduction lines 162, 164, 166, respectively.

The controller 160 may bypass the heat load reduction lines 162, 164, 166 (and associated circulation loops 132, 134, 136) by closing valves 212, 214, 222, 224, 232, and 234 and opening valves 216, 226, and 236. This bypassing may be performed when the temperature received by the controller 160 (e.g., from temperature sensors 152, 154, 156) in all three hydrogen fuel storage tanks 122, 124, 126 is greater than the temperature at T2 or if the lowest temperature among all three tanks is a predetermined amount higher than the temperature at T2.

In one or more embodiments, the controller 160 may determine a number of hydrogen fuel storage tanks 122, 124, 126 which has a temperature less than the temperature at T2 and utilize one or more of those hydrogen fuel storage tanks 122, 124, 126 as heat syncs by flowing hydrogen fuel through associated heat load reduction lines 162, 164, 166 (and associated circulation loops 132, 134, 136).

For example, if the temperature in hydrogen fuel storage tank 124 is the lowest among all three tanks, the controller 160 may close valves 212, 214, 232, and 234 to disable heat load reduction lines 164 and 166. Valves 216 and 236 remain open to enable hydrogen fuel flow through the hydrogen fueling station 100, and ultimately to the dispenser 180. Valve 226 is closed by the controller 160 and valves 222 and 224 are opened to enable hydrogen fuel to flow from the pressure control device 150 to a first point downstream of the pressure control device 150 (e.g., near valve 222), through valve 222, through the heat load reduction line 164, up through the circulation loop 134, passing through the path wound around the second hydrogen fuel storage tank 124, and back down to a second point downstream of the pressure control device 150 (e.g., near valve 224), through valve 224, and onto the dispenser 180. In this way, the controller 160 may manage flow of the hydrogen fuel from a first point downstream of the pressure control device 150 through one of the fuel storage tanks, and back to a second point downstream.

In one or more other embodiments, multiple groups of valves 210, 220, and 230 may be utilized to cool the hydrogen fuel near T2. For example, in addition to using the valves associated with group 220, the valves of group 230 may also be operated by the controller 160 to flow hydrogen fuel through another circulation loop 136 (e.g., if the temperature of the third hydrogen fuel storage tank 126 is less than the temperature at T2). This may be achieved by opening valves 232 and 234, while closing valve 236. In this way, hydrogen fuel may flow through heat load reduction lines 164 and 166 and through the first circulation loop 132 and then through the second circulation loop 134, thereby utilizing multiple circulation loops. The controller 160 may analyze the temperatures of associated hydrogen fuel storage tanks 122, 124, 126 to determine the appropriate path for the hydrogen fuel. For example, if the temperature at T2 is greater than a threshold temperature or greater than the temperature in the lowest temperature hydrogen fuel storage tank by a predetermined threshold or factor, then multiple circulation loops may be utilized.

Figure 3:
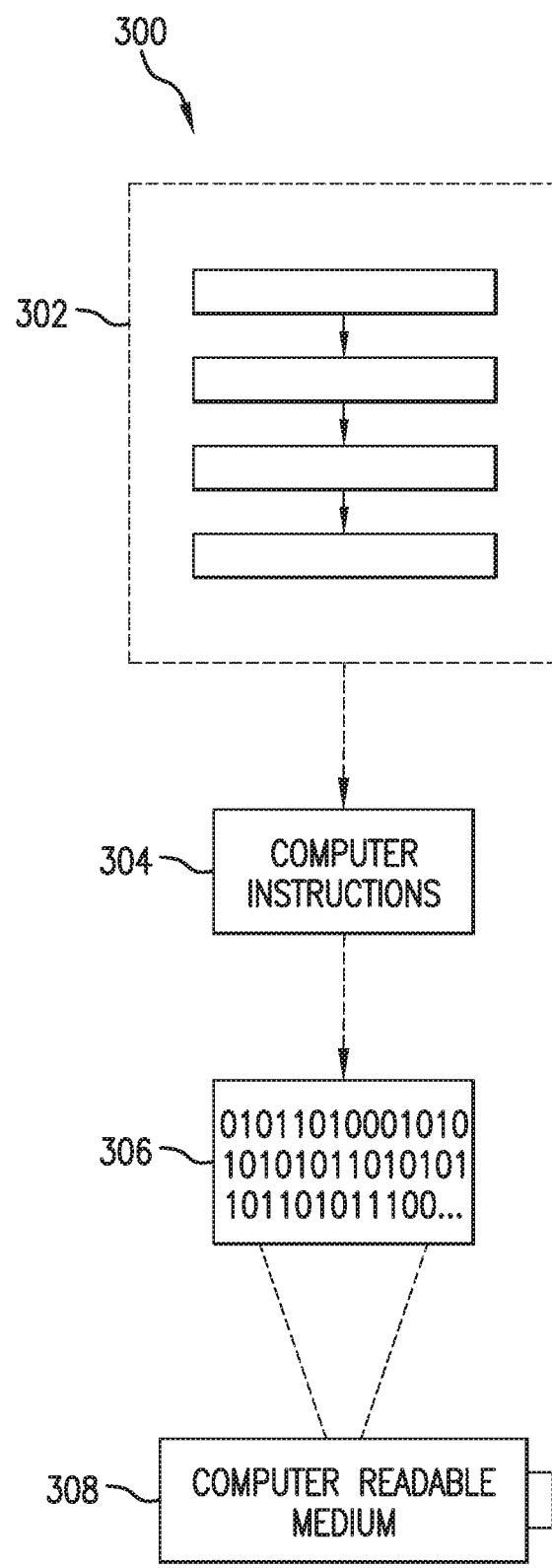
FIG. 3 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 3, wherein an implementation 300 includes a computer-readable medium 308, such as a CD-R, DVD-R, flash drive, a platter of a hard disk drive, etc., on which is encoded computer-readable data 306. This computer-readable data 306, such as binary data including a plurality of zero's and one's as shown in 306, in turn includes a set of computer instructions 304 configured to operate according to one or more of the principles set forth herein. In one such embodiment 300, the processor-executable computer instructions 304 may be configured to perform a method 302, such as a method for managing flow of hydrogen fuel through one or more of the heat load reduction lines 162, 164, 166 or one or more of the circulation loops 132, 134, 136 based on temperatures of the corresponding hydrogen fuel storage tanks 122, 124, 126. In another embodiment, the processor-executable instructions 304 may be configured to implement a system, such as the hydrogen fueling station 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 4 and the following discussion provide a description of a suitable computing environment to implement embodiments of one or more of the provisions set forth herein. The operating environment of FIG. 4 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, programmable logic controllers (PLC), distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 4 illustrates a system 400 including a computing device 412 configured to implement one or more embodiments provided herein. In one configuration, computing device 412 includes at least one processing unit 416 and memory 418. Depending on the exact configuration and type of computing device, memory 418 may be volatile, such as RAM, non-volatile, such as ROM, flash memory, etc., or a combination of the two. This configuration is illustrated in FIG. 4 by dashed line 414.

In other embodiments, device 412 includes additional features or functionality. For example, device 412 may include additional storage such as removable storage or non-removable storage, including, but not limited to, magnetic storage, optical storage, etc. Such additional storage is illustrated in FIG. 4 by storage 420. In one or more embodiments, computer readable instructions to implement one or more embodiments provided herein are in storage 420. Storage 420 may store other computer readable instructions to implement an operating system, an application program, etc. Computer readable instructions may be loaded in memory 418 for execution by processing unit 416, for example.

The term "computer readable media" as used herein includes computer storage media. Computer storage media includes volatile and nonvolatile, removable and non-removable media implemented in any method or technology for storage of information such as computer readable instructions or other data. Memory 418 and storage 420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 412. Any such computer storage media is part of device 412.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 412 includes input device(s) 424 such as keyboard, mouse, pen, voice input device, touch input device, infrared cameras, video input devices, or any other input device. Output device(s) 422 such as one or more displays, speakers, printers, or any other output device may be included with device 412. Input device(s) 424 and output device(s) 422 may be connected to device 412 via a wired connection, wireless connection, or any combination thereof. In one or more embodiments, an input device or an output device from another computing device may be used as input device(s) 424 or output device(s) 422 for computing device 412. Device 412 may include communication connection(s) 426 to facilitate communications with one or more other devices 430, such as through network 428, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hydrogen fueling station, comprising:
a hydrogen fuel storage tank;
a pressure control device including one or more control valves positioned downstream from the hydrogen fuel storage tank and connected to the hydrogen fuel storage tank by a first fuel line;
a dispenser positioned downstream from the pressure control device and connected to the pressure control device by a second fuel line;
a heat load reduction line which forms a circulation loop from a first point downstream of the pressure control device to the hydrogen fuel storage tank and back to a second point downstream of the pressure control device;
a compressor positioned upstream from the hydrogen fuel storage tank and connected to the hydrogen fuel storage tank;
a second hydrogen fuel storage tank;
a first temperature sensor monitoring a first temperature of the hydrogen fuel stored in the hydrogen fuel storage tank;
a second temperature sensor monitoring a second temperature of the hydrogen fuel stored in the second hydrogen fuel storage tank;
a valve configured to control flow of hydrogen fuel through the circulation loop and a second circulation loop; and
a controller controlling operation of the valve based on the first temperature and the second temperature;
wherein the pressure control device is positioned downstream from the second hydrogen fuel storage tank and connected to the second hydrogen fuel storage tank,
wherein the heat load reduction line includes the second circulation loop from the first point downstream of the pressure control device to the second hydrogen fuel storage tank and back to the second point downstream of the pressure control device, and
wherein the controller operates the valve to flow hydrogen fuel through the circulation loop of the heat load reduction line based on the first temperature being less than the second temperature.

2. The hydrogen fueling station of claim 1, comprising a heat exchanger positioned downstream from the pressure control device and connected to the pressure control device.

3. A hydrogen fueling station, comprising:
a first hydrogen fuel storage tank;
a pressure control device including one or more control valves positioned downstream from the first hydrogen fuel storage tank and connected to the first hydrogen fuel storage tank;
a dispenser positioned downstream from the pressure control device and connected to the pressure control device;
a heat load reduction line which includes a first circulation loop from a first point downstream of the pressure control device to the first hydrogen fuel storage tank and back to a second point downstream of the pressure control device;
a compressor positioned upstream from the first hydrogen fuel storage tank and connected to the first hydrogen fuel storage tank;
a second hydrogen fuel storage tank;

a first temperature sensor monitoring a first temperature of the hydrogen fuel stored in the first hydrogen fuel storage tank;

a second temperature sensor monitoring a second temperature of the hydrogen fuel stored in the second hydrogen fuel storage tank;

a valve configured to control flow of hydrogen fuel through the first circulation loop and a second circulation loop; and a controller controlling operation of the valve based on the first temperature and the second temperature;

wherein the pressure control device is positioned downstream from the second hydrogen fuel storage tank and connected to the second hydrogen fuel storage tank, wherein the heat load reduction line includes the second circulation loop from the first point downstream of the pressure control device to the second hydrogen fuel storage tank and back to the second point downstream of the pressure control device, and wherein the controller operates the valve to flow hydrogen fuel through the first circulation loop of the heat load reduction line based on the first temperature being less than the second temperature.

4. The hydrogen fueling station of claim 3, wherein the second hydrogen fuel storage tank is cascaded with the first hydrogen fuel storage tank.

5. The hydrogen fueling station of claim 3, wherein the controller operates the valve to bypass both the first and second circulation loops of the heat load reduction line based on a temperature of the first point downstream of the pressure control device being less than or equal to both the first temperature and the second temperature.

6. The hydrogen fueling station of claim 3, wherein the controller operates the valve to flow hydrogen fuel through the second circulation loop of the heat load reduction line based on the second temperature being less than the first temperature.

7. The hydrogen fueling station of claim 3, wherein the heat load reduction line includes one or more protrusions.

8. The hydrogen fueling station of claim 7, wherein one or more of the protrusions are fins.

9. The hydrogen fueling station of claim 3, wherein a path of the heat load reduction line through the first hydrogen fuel storage tank has a shape of a loop, an 'S', or a zig-zag.

10. The hydrogen fueling station of claim 3, comprising a heat exchanger positioned downstream from the pressure control device and connected to the pressure control device.

11. A hydrogen fueling station, comprising:

a hydrogen fuel storage tank;

a pressure control device including one or more control valves positioned downstream from the hydrogen fuel storage tank;

a dispenser positioned downstream from the pressure control device;

a heat load reduction line which forms a circulation loop from a first point downstream of the pressure control device to the hydrogen fuel storage tank, wherein hydrogen fuel within the heat load reduction line does not mix with the hydrogen fuel within the hydrogen fuel storage tank;

a compressor positioned upstream from the hydrogen fuel storage tank and connected to the hydrogen fuel storage tank;

a second hydrogen fuel storage tank;

a first temperature sensor monitoring a first temperature of the hydrogen fuel stored in the hydrogen fuel storage tank;

a second temperature sensor monitoring a second temperature of the hydrogen fuel stored in the second hydrogen fuel storage tank;

a valve configured to control flow of hydrogen fuel through the circulation loop and a second circulation loop; and a controller controlling operation of the valve based on the first temperature and the second temperature;

wherein the pressure control device is positioned downstream from the second hydrogen fuel storage tank and connected to the second hydrogen fuel storage tank, wherein the heat load reduction line includes the second circulation loop from the first point downstream of the pressure control device to the second hydrogen fuel storage tank and back to the second point downstream of the pressure control device, and wherein the controller operates the valve to flow hydrogen fuel through the circulation loop of the heat load reduction line based on the first temperature being less than the second temperature.

* * * * *